April 23, 1968     T. J. KRUSZKA     3,379,959
AUTOMATIC ATTENUATOR DEVICE
Filed April 30, 1965     3 Sheets-Sheet 1
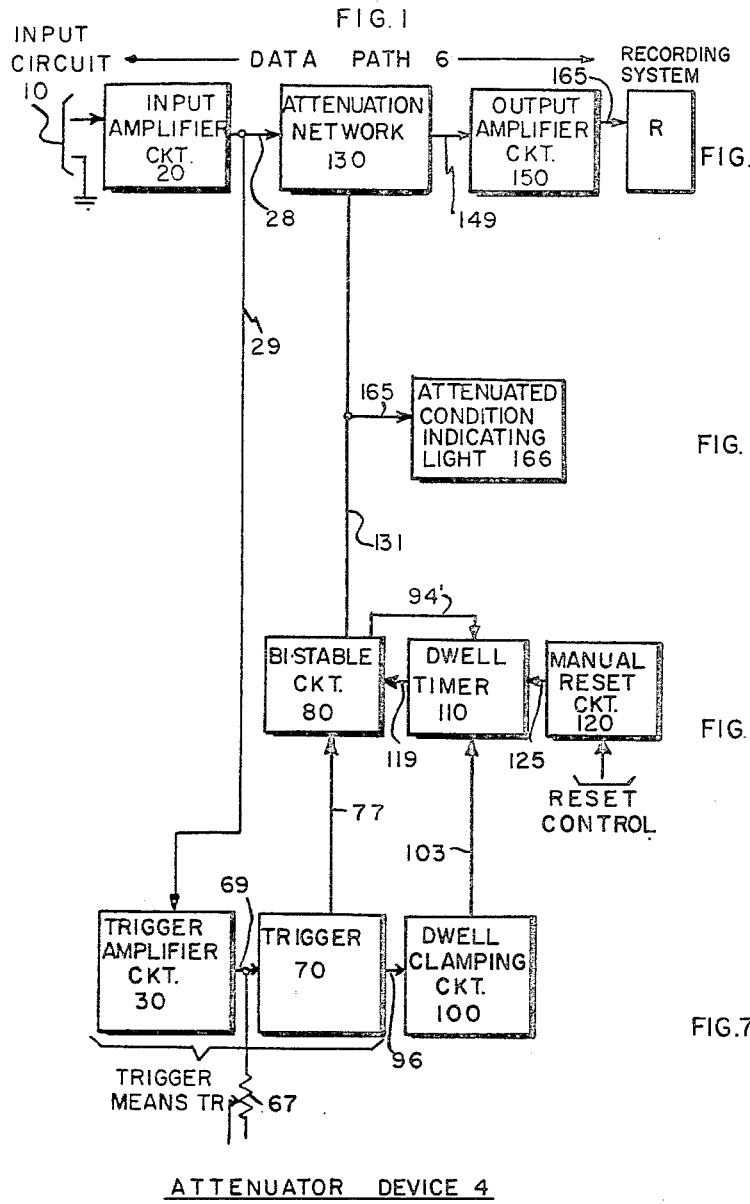
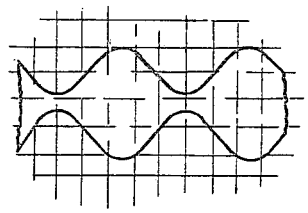
UNATTENUATED SIGNAL
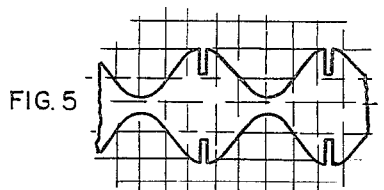
FIG. 5
TRIGGER LEVEL REACHED
PEAK ATTENUATED
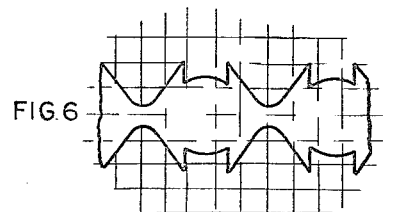
FIG. 6
AMPLITUDE CONTINUES TO
INCREASE-MAXIMUM OUTPUT
LEVEL
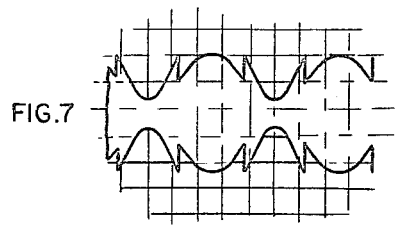
FIG. 7
ATTENUATED LEVEL
REACHES TRIGGER LEVEL
INVENTOR
THOMAS J. KRUSZKA
BY *Brown Jackson Boettcher & Dienner*
ATTYS.

April 23, 1968  T. J. KRUSZKA  3,379,959
AUTOMATIC ATTENUATOR DEVICE
Filed April 30, 1965  3 Sheets-Sheet 2

INVENTOR
THOMAS J. KRUSZKA
BY Brown Jackson Boettcher & Dienner
ATTYS.

April 23, 1968  T. J. KRUSZKA  3,379,959
AUTOMATIC ATTENUATOR DEVICE
Filed April 30, 1965  3 Sheets-Sheet 3

INVENTOR
THOMAS J. KRUSZKA
BY Brown Jackson Boettcher & Dienner
ATTYS.

United States Patent Office 3,379,959
Patented Apr. 23, 1968

3,379,959
AUTOMATIC ATTENUATOR DEVICE
Thomas J. Kruszka, Woodson Terrace, Mo., assignor to Sangamo Electric Company, Springfield, Ill., a corporation of Delaware
Filed Apr. 30, 1965, Ser. No. 452,254
6 Claims. (Cl. 323—22)

ABSTRACT OF THE DISCLOSURE

An automatic signal attenuator having high speed switching characteristics in the order of one microsecond for reducing the signal level in a data channel as a step function whenever a predetermined level is exceeded, and including dwell timer means to permit selection of a dwell period for which attenuation is maintained subsequent to input signal decrease below the preset level. Manual reset is used with an indefinite dwell time.

---

Figure 2:
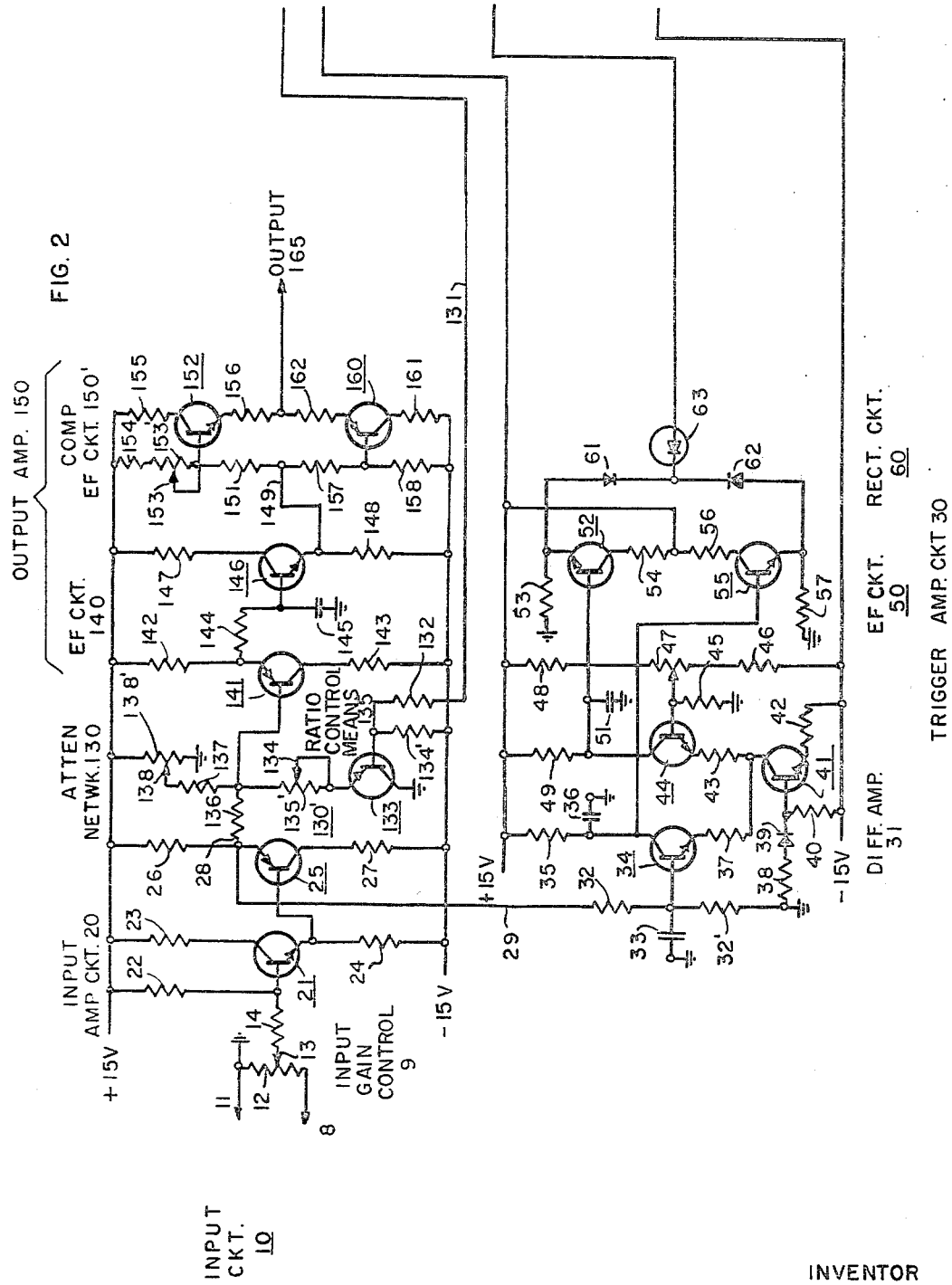

The present invention is directed to an automatic attenuator device for extending the dynamic range of data instrumentation.

In numerous instances in which intruments are used to measure data information, it is frequently necessary to work with data of relatively unknown and unpredictable parameter variations. It is difficult in such instances to select the instruments having the proper range of response, and to calibrate the selected instruments to provide the desired response range. Frequently the calibration effected amounts to no more than calculated guess work. In such event it is not unusual to experience over-modulation and poor resolution which in turn results in poor data fidelity or even a complete loss of data. When the tests indicate that the data obtained is not satisfactory, it is necessary for the user to recalibrate the system and repeat the test. Such procedure is, of course, time consuming and expensive.

The problem is well known in the recording field, as for example, the field of magnetic tape recording, strip chart recording, and the like. The problem particularly arises in the recording of units of data which are of a relatively unknown amplitude. As indicated, when faced with such problem, the user will normally venture a calculated guess as to the extent of calibration required, and if the guess is wrong, the system is recalibrated and the test repeated.

One technique used in the field to forestall repeated testing consists of calibrating the instrumentation for the maximum amplitude expected. In using such a technique, however, the system noise and poor resolution result in the loss of low level data and therefore has limited advantages.

Yet another practice used in the field consists of providing two data channels having parallel inputs, and calibrating one channel for high sensitivity and the other channel for low sensitivity. Such technique requires redundant equipment, duplication of set up time, and is, generally speaking, not satisfactory.

It is an object of the present invention therefore to provide an automatic attenuator which may be connected to extend the dynamic range of a recording system, and particularly to an automatic attenuator unit having means for automatically attenuating the data signal amplitude by a predetermined factor only if the amplitude of the data signal exceeds a predetermined level established for the attenuator device.

It is a specific object of the invention to provide a novel attenuator of such type which includes means for providing two discrete gain states, normal or attenuated, to enable parameter variation without the problem of continuous changes, such as are experienced in conventional automatic gain control devices, and adjustment means for preselecting the value at which switching occurs between the two states.

It is a further object of the invention to provide attenuation switching means for inserting attenuation in a path responsive to the input data exceeding a predetermined set level and automatically removing the attenuation from the path responsive to the data falling below the predetermined level, and bi-polar peak reading means for selectively controlling the attenuation switching means in such operation.

It is yet another object of the invention to provide attenuaiton switching means of such type, a dwell timer circuit which is operative to initiate the measurement of a predetermined timing or dwell period whenever the input signal is of a value to indicate that attenuation is no longer required, means for controlling the attenuation switching means to remove the attenuation from the path after the dwell period has expired, and means for resetting the dwell timer whenever a data change occurs during the dwell period indicating that attenuation is required.

It is a specific object of the invention to provide an attenuation device for extending the dynamic range of a recording system comprising a data path, an input circuit for supplying signal data to the data path, an output circuit for connecting the data path to a recording system, an attenuator network, attenuation means for selectively inserting the attenuation network in the data path between the input and output circuits, sensing means for sensing the voltage level of the data input to the data path including a differential amplifier connected to the input circuit for providing output signals representative of the voltage level of the input signals, a trigger means including a relaxation oscillator responsive to the signals which indicate a predetermined level has been exceeded, and a multivibrator circuit controlled by the trigger means to enable the attenuation switch means in the connection of attenuation in the path.

A feature of the arrangement is the manner in which the insertion of the novel attenuator unit between the source and the input to the recording system allows the data channel to be precisely calibrated with the maximum desired sensitivity to the anticipated parameter values so that both high and low sensitvity calibration of the same data channel is provided without sacrificing the signal to noise ratio.

Figure 3:
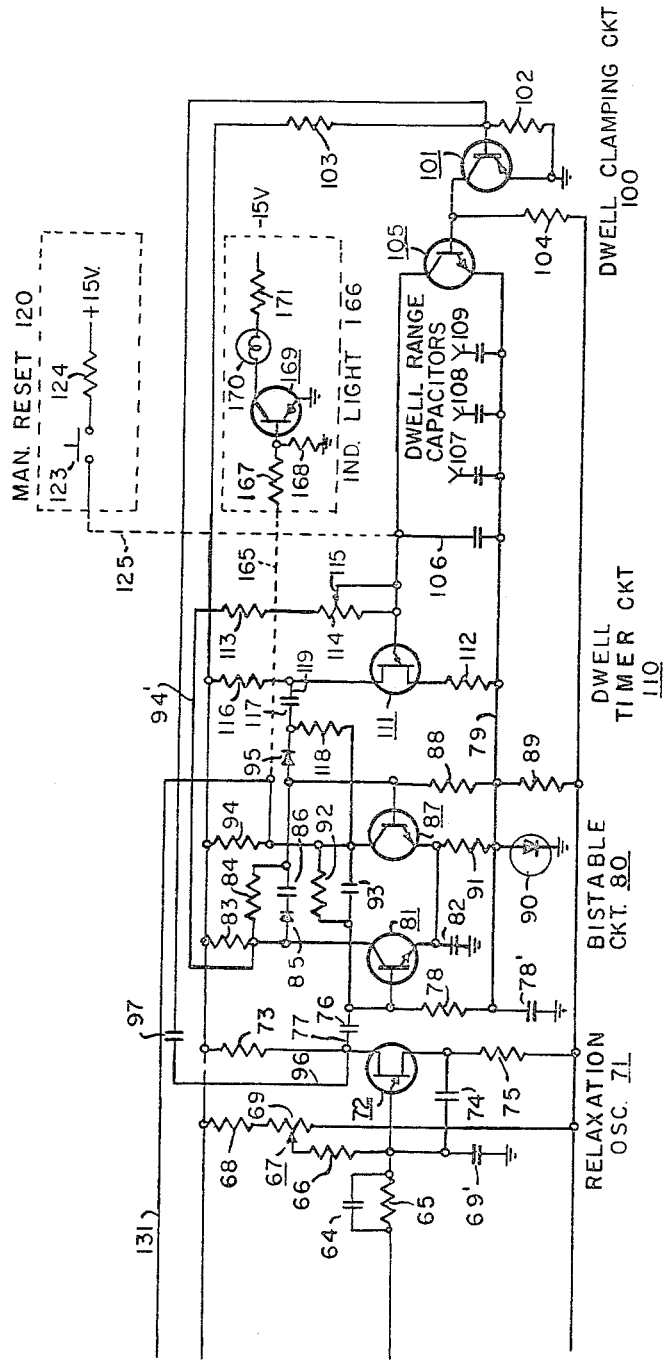

These and other features of the invention which are believed to be new will be apparent with reference to the following specification, claims and drawings in which:

FIGURE 1 sets forth a block diagram of the circuitry of the novel attenuator unit;

FIGURES 2 and 3 set forth a schematic circuit diagram of the attenuator unit; and FIGURES 4–7 set forth illustrations of a set of waveforms provided on an oscilloscope with connection of the attenuator unit to provide automatic attenuation for a path.

GENERAL CIRCUIT DESCRIPTION

The automatic attenuator device 4 which is electronically switched in response to changing input signal amplitudes is shown in block in FIGURE 1, and as there shown includes an input circuit 10 connected to an input amplifier circuit 20 which has a high input impedance and a low output impedance. The output of the input amplifier circuit 20 is extended over a first path 28 to attenuator network 130 and over a second path 29 to a trigger amplifier circuit 30.

The data information on path 28 is further extended over an attenuation network 130, which as will be shown, is controlled to transmit the signals in alternatively an unattenuated or attenuated condition over path 149 and output amplifier circuit 150 to an output circuit 165 which may in turn be coupled to a recording system R. The data path 6 thus includes input circuit 10, input amplifier circuit 20, path 28, attenuation network 130, path 149, output amplifier circuit 150 and output circuit 165.

The second path 29 output from amplifier circuit 30 extends to trigger means TR which include a trigger amplifier circuit 30 having a differential amplifier, and rectifier means, the rectified output of which is connected over path 69 to a trigger circuit 70.

The trigger circuit 70 in trigger means TR in turn include a threshold setting device 67 which is adjustable to different positions to thereby vary the level at which attenuation is to be inserted in the data path. If the signal from the trigger amplifier 30 exceeds the level established by trigger setting device 67, trigger 70 which includes a voltage sensitive device, such as a relaxation oscillator, operates to provide a signal over conductor 96 to dwell clamping circuit 100 and over path 77 to bistable circuit 80.

Bistable circuit 80 in response to such signal changes state and over path 131 activates the attenuation network 130 to attenuate the information in the data path 6 by a preselected amount, and over path 165 completes an energizing circuit for an indicating lamp 166 to indicate to the user that attenuation is inserted in the path.

The bistable circuit 80 in changing states is also operative to apply a signal over path 94' to a dwell timer 110 during the period that the trigger amplifier 30 and trigger circuit 70 sense a data signal on the data path 6 which is in excess of the value of the level established by the setting device 67. During the same period, however, the trigger circuit 70 provides a signal over path 96 to dwell clamping signal 100 which, in turn, provides a signal over path 103 to the dwell timer 110 to inhibit the dwell timer 110 from responding to the signal output of bistable circuit 80.

At such time as the signal falls below the predetermined value established by the trigger setting device 67, the signal provided by trigger 70 to dwell clamping circuit 100 is removed, and dwell timer 110 is enabled to initiate a preselected timing period. Dwell timer 110 includes means for adjusting the measured period to different values, as desired. When the time period selected is exceeded, dwell timer circuit 110 provides a reset signal over path 119 to bistable circuit 80. As will be shown, if the data signal on data path 6 exceeds the level selected by trigger setting device 67 during the measurement of the timing period by dwell timer 110, the dwell timer 110 is reset and the measurement is terminated.

In the event that indefinite dwell is used (if the dwell clamping circuit 100 is not used) the system is reset by means of a manual reset circuit 120.

SPECIFIC CIRCUIT DESCRIPTION

*Data path*

The specific circuitry and connection thereof to achieve automatic attenuation in such manner is set forth in FIGURES 2 and 3. As shown in FIGURE 2, the input circuit 10 includes input conductors 8, 11 and an input gain control device 9 comprising a potentiometer 12 having an adjustable arm 13, one end of potentiometer 12 being connected to ground and conductor 11 and the other end of potentiometer 12 being connected to input conductor 8.

The adjustable arm 13 of potentiometer 12 in the input gain control 9 is connected over resistance 14 to the input side of the input amplifier circuit 20 and is adjustable to different positions to vary the amplitude of the input signal received over input circuits 8, 11 to be compatible with the range of the automatic attenuation device 4 as will be shown in more detail hereafter.

The input amplifier circuit 20 basically comprises a first and second transistor 21, 25 series connected as emitter followers to provide a high input impedance to the incoming signals received over input circuit 10 and a low output impedance as connected to the output paths 28 and 29. The output path 28 is connected to the input for attenuation network 130 and path 29 is connected to the input for the trigger amplifier circuit 30.

More specifically, the input amplifier circuit 20 includes an NPN transistor 21 which may be of the type commercially available as a 2N930, having a collector element connected over resistor 23 to positive 15 volt potential, a base element connected via resistor 14 and input gain control 9 to the input circuit 10, and also over resistor 22 to positive 15 volt potential, and an emitter element connected over resistor 24 to negative 15 volt potential. The emitter element of transistor 21 is also connected to the base element of the second transistor 25 which may be a PNP transistor of the type commercially available as a 2N526 and which includes a collector element connected over resistor 27 to negative 15 volts, a base element connected to the emitter output of the first transistor 21, and an emitter element connected over resistor 26 to positive 15 volt potential. The emitter element of transistor 25 is also connected over path 28 and resistor 136 to the input for attenuator network 130 and over path 29 to the input for trigger amplifier circuit 30.

As will be shown, the attenuation network 130 basically comprises a voltage divider circuit including resistances 137 and adjustable resistors 135', 138' which are connected to be selectively enabled by a series semiconductor switch 133 to attenuate the data received over input circuit 10, amplifier circuit 20 and path 28, the amount of attenuation being determined by a ratio which is preselected by adjustment of the adjustable arm 134 on ratio control means 135. With semiconductor switch 133 turned off, the signals from the input amplifier 20 are extended directly over path 28 to the emitter follower circuit 140, conductor 149, and the complementary emitter follower circuit in the output amplifier 150 to output circuit 165. With semiconductor switch 133 turned on, the signals on such path are attenuated by voltage divider 135', 137, 138'.

More specifically, attenuation switch 130' includes a PNP transistor 133 which may be of the type commercially available as a 2N404 connected to operate as an on-off switch. The transistor 133 includes a collector element connected to ground, a base element connected over resistor 132 and conductor 131 to the signal output of the bistable circuit 80, which provides a switching signal for transistor 133 whenever the data information is to be attenuated in data path 6. The base of transistor 133 is also connected over resistor 134' to negative 15 volt potential and the emitter element is connected over ratio control means 135, and over resistor 137 and adjustable arm 138 on potentiometer 138', which is in turn connected between positive 15 volt potential and ground.

The data signals on path 28 (attenuated or unattenuated depending upon the condition of the attenuation switch 130') are coupled to the emitter follower circuit 140 in output amplifier circuit 150. Such circuit includes a first PNP transistor 141 which may be of the type commercially available as a 2N1305 including a collector element connected over resistor 143 to negative 15 volt potential, a base element connected to the output of the attenuation switch 130', and an emitter element connected over resistor 142 to positive 15 volts potential and also over resistor 144 to the base element of the second transistor 146 in the emitter follower circuit 140.

Transistor, 146 is a NPN transistor which may be of the type commercially available as a 2N1304, having a collector element connected over resistor 147 to positive 15 volt potential, a base element connected to the collector output of the first transistor 141, and also over capacitor 145 to ground, and an emitter element connected over resistor 148 to negative 15 volt potential, and also over output circuit 149 which extends the amplified output of transistors 141, 146 to a pair of complementary emitter follower transistors 152, 160 which are connected to provide a low impedance output over output circuit 165.

More specifically, the complementary emitter follower circuit 150' includes a PNP transistor 160, which may be of the type commercially available as a 2N1305, having a collector element connected over resistor 161 to negative 15 volt potential, a base element connected to the junction of resistors 157 and 158 which are connected in the voltage divider circuit including resistors 154, 153', 151, 157, 158, extending between positive and negative 15 volt potential. The junction of resistors 151 and 157 is connected to the emitter output of transistor 146 so that the signal output of the emitter follower circuit is fed to the base of transistor 160. Transistor 160 also includes an emitter element connected over resistor 162 to the output circuit 165. The complementary NPN transistor 152, which may be of the type commercially available as a 2N1304, includes a collector element connected over resistor 155 to positive 15 volt potential, a base element connected to adjustable arm 153 on resistor 153' in the voltage divider described above, whereby the output of emitter follower 146 is also fed to the base element of transistor 152. The emitter element of transistor 152 is connected over resistor 156 to the output circuit 165.

As indicated above, the complementary transistors 152, 160 are connected as emitter followers to provide a low output impedance for the output circuit 165. It is apparent from the foregoing description that data signals provided to input circuit 10 are fed over the data path 6 (which includes input gain control 9, input amplifier circuit 20, attenuation network 130, and output amplifier 150) to the output circuit 165.

If the data signals are a a level less than a selected value, the signals are extended from the input path 10 over the described circuits to the output circuit 165 without attenuation. In the event that the input signals exceed the preselected signal level, a peak reading detector arrangement senses such signal level, and instantaneously provides a signal over conductor 131 to the attenuation switch 133 to enable the switch 130' to insert a preselected amount of attenuation, thereby causing a corresponding drop in the amplitude of the signals which are transmitted over output circuit 165. When the level of the data signals on the input circuit 10 decreases to a level below the preselected threshold value, the attenuation will be removed in a manner dependent upon the circuit parameters selected. The manner in which the circuitry is operative to detect the occurrence of signals which exceed such level, and to effect the automatic insertion and removal of the attenuator from the data path is now set forth.

*Sensing and control circuitry*

As noted above, the data signals received over the input circuit 10 and extended over input amplifier 20, in addition to being transmitted over path 28 and the attenuation network 130, are also extended over path 29 to the input circuit of trigger amplifier 30. As shown in FIGURE 2, the trigger amplifier circuit 30 comprises a differential amplifier circuit comprised of three NPN transistors 34, 44 and 41, each of which may be of the type commercially available as a 2N1304; a pair of NPN transistors 52, 55 of the same type connected as emitter followers to the output of the differential amplifier, and a rectifier circuit 60 connected between the output of the emitter follower circuits 50 and the input to the trigger circuit 70. As will be shown, the trigger amplifier circuit 30 is responsive to the signals on path 29 to provide amplified normal and inverted output signals over emitter follower circuit 50 and rectifier circuit 60 which, in turn, provides related signals of positive polarity to the trigger circuit 70.

More specifically, differential amplifier 31 comprises a first transistor 41 having an emitter element connected over resistor 42 to negative 15 volt potential, a base element connected over resistor 50 to negative 15 volt potential, and over diode 39 and resistor 38 to ground and a collector element connected over resistors 37, 43 to the emitter elements of the differential amplifier transistors 34, 44. Transistor 41 operates to provide a constant current supply for the transistors 34, 44 and thereby a more stable output from differential amplifier 31.

Transistor 34 includes an emitter element connected over resistor 37 to the collector of transistor 41, a base element connected over resistor 32 to the input path 29, and over RC circuit 32', 33 to ground, and a collector element connected over capacitor 36 to ground, and over resistor 35 to positive 15 volt potential, and also to the input for the first transistor 55 in the emitter follower circuit 50.

Transistor 44 in the differential amplifier includes an emitter connected over resistor 43 to the collector of transistor 41, a base element connected over resistor 45 to ground, and to the adjustable arm on resistor 47 in the voltage divider which includes resistors 46, 47, 48 connected between positive and negative 15 volt sources, and a collector element connected over resistor 49 to positive 15 volt potential, and also to the base of the second transistor 52 in the emitter follower circuit 50. Capacitor 51 is connected between the collector output circuit and ground.

The differential amplifier operates as a bipolar sensor in the conventional manner to provide a normal and an inverted amplified output of the data signals received, so that signals of increased gain are provided to the emitter follower circuit 50 for both negative and positive input signals. Adjustable resistance 47 is used to provide polarity balance for the output signals from transistors 34 and 44 respectively.

The amplified inverted and normal output signals of transistors 34, 44 respectfully are extended to the base elements of transistors 52, 55 respectively in the emitter follower circuit 50 which operate in the manner of conventional emitter follower devices to transmit the normal and inverted signals which are applied at the base elements of the respective transistors 52, 55 by the differential amplifier 31.

Briefly, transistor 52 comprises an NPN transistor having a collector connected over resistor 54 to positive 15 volt potential, a base element connected to the output of the transistor 44 in differential amplifier 31 and an emitter element connected over resistor 53 to ground, and also over rectifier 61 to diode 63. The second transistor 55 in the emitter follower circuit includes a collector connected over resistor 56 to positive 15 volt potential, a base element connected to the output of transistor 34 in differential amplifier circuit 31, and an emitter element connected over resistor 57 to ground, and also over rectifier diode 62 to diode 63. Rectifiers 61, 62 rectify the output signals of the emitter follower circuit 50 and conduct same to diode 63 which adds the output of both rectifiers 61, 62 to provide positive going signals to the RC ciricuit 64, 65 connected in the input of trigger circuit 70.

Trigger circuit 70 basically comprises a relaxation oscillator circuit 71 including a unijunction transistor 72 which will operate as a relaxation oscillator whenever the amplitude of the positive going signal output from trigger amplifier 30 exceeds the threshold setting of the potentiometer 67 which is connected in the input circuit of trigger 70. The output signals provided by trigger circuit 70 are transmitted over path 77 to bistable circuit 80, and also over path 96 to the dwell clamping circuit 100. As will be shown, the trigger circuit 70 provides output signals for the entire period that the data signal received over input circuit 10 exceeds the preestablished signal level.

More specifically, relaxation oscillator 71 in trigger 70 includes a unijunction transistor 72 which may be of the type commercially available as a 2N1671B and which comprises a first base element connected over resistor 75 to negative 15 volt potential, and over capacitor 74 to the common emitter element of transistor 72, and a second base element connected over resistor 73 to positive 15 volt potential, and to the two output paths 77, 96 which extend to the bistable circuit 80 and dwell clamping circuit 100 respectively.

The common emitter element for unijunction transistor 72 is connected (a) over RC circuit 64, 65 to the output of the rectifier circuit 60, (b) over capacitor 69' to ground, (c) over capacitor 74 to the first base element of transistor 72, and (d) over resistor 66 to the arm of adjustable resistor 69 which in turn is connected with resistor 68 between negative and positive 15 volt potential.

Whenever the input signal received at the emitter of transistor 72 from the trigger amplifier 30 exceeds the bias level established on the emitter element by the setting of resistor 69, the relaxation oscillator 71 is energized to repeatedly transmit negative going signals over paths 77, 96 respectively. That is, as the bias level is exceeded, unijunction transistor 72 conducts and completes a discharge circuit for capacitor 69' and capacitor 74 which extends over transistor 72 and resistor 75 to ground. During this period the potential on paths 77, 96 is driven negative. As the capacitor discharges the potential on paths 77, 96 goes more positive. When the capacitor discharges to a value which is insufficient with the input signal to maintain transistor 72 conducting, the transistor cuts off, and the potential on output paths 77, 96 goes positive. The capacitor now recharges over its charging path until a value is reached to reoperate transistor 72. Such cycling continues for the period that the data signal on the input path 10 is of a value in excess of the value predetermined by the setting on resistince 69.

The output signals thus provided over path 77 are extended via capacitor 76 to the bistable circuit 80 which includes a first and second transistor 81, 87 connected in the manner of a bistable multivibrator circuit. An output signal is provided by the bistable circuit 80 over conductor 131 and resistor 132 (FIG. 2) to the attenuation switch transistor 133 which operates to insert attenuation in the data path 6 in the manner described heretofore.

More specifically, bistable circuit 80 comprises a first NPN transistor 81 which may be of the type commercially available as a 2N1304 having an emitter connected over capacitor 82 to ground, a base element connected (a) over capacitor 76 to the output circuit 77 of relaxation oscillator 71, (b) over RC network 92, 93 to the collector of transistor 87 and over capacitor 117 to the output of dwell timer circuit 110, and (c) over resistor 78 to constant potential conductor 79 and over capacitor 78' to ground. As will be seen, the constant potential conductor 79 is connected over capacitor 78' to ground, over resistance 89 to negative 15 volt potential, and over Zener diode 90 to ground. The Zener diode in one embodiment was of the type commercially available as a SV9.

The collector element of the first bistable multivibrator transistor 81 is connected (a) over resistor 83 to positive 15 volt potential, (b) over conductor 94' to the dwell timer circuit 110, and (c) over diode 85, capacitor 86 and parallel resistor 84 to the base of the second transistor 87.

The second transistor 87 in the bistable circuit 80 is an NPN transistor which may be of the type commercially available as a 2N1304 having an emitter connected common with the emitter of transistor 81 and over resistor 91 to conductor 79, a base element connected as described above to the collector output of the first transistor 81, and over resistor 88 to conductor 79, and a collector element connected (a) over RC circuit 92, 93' to the base of the first transistor 81, (b) over resistor 94 to positive 15 volt potential, (c) over conductor 131 to the base element of attenuator switch transistor 133, and (d) over resistor 118 to the output path 119 of dwell timer 110.

In the absence of a signal from the relaxation oscillator 71 (indicating that the trigger level has not been exceeded by the data on input circuit 10) it is first assumed that transistor 81 is switched on and the more positive signal which appears at the common emitter of transistors 81, 87 causes the transistor 87 to be turned off. If the transistor 81 were not on, a positive signal would be extended over conductor 94' and as will be shown dwell timer 110 would operate after the selected dwell time to provide an output signal over conductor 119 to set the bistable circuit 80 to the normal condition (transistor 81 on, transistor 87 off).

The positive potential appearing at the collector of transistor 87 with the bistable circuit 80 in the normal condition is extended over conductor 131 and resistor 132 to the base of the transistor 133 which is maintained in the switched-off state.

As an input signal appearing at the input circuit 10 of the attenuator device is extended over input amplifier 20 and trigger amplifier 30 which exceeds the bias provided by adjustable resistor 69, the relaxation oscillator 71 is turned on, and the resultant negative pulses coupled to the base of transistor 81 in bistable circuit 80 turn off transistor 81. The positive signal which appears at the collector of transistor 81 is coupled to the base of transistor 87 which turn on, and the negative going signal appearing in the collector of transistor 87 is extended over conductor 131 and resistor 132 to the base of switching transistor 133 which is turned on to connect the voltage divider 135', 137, 138 in circuit to attenuate the data signals on data path 6.

During the period of reset of bistable circuit 80 (the "normal" period when the data signals on input path 10 are less than a preselected value) transistor 81 is conducting, and the resultant negative potential on conductor 94' is extended to the emitter element of unijunction transistor 111 in dwell timer circuit 110 to maintain transistor 111 turned off.

When the bistable circuit 80 sets (transistor 81 off responsive to operation of the relaxation oscillator 71) the negative inhibit potential is removed from the emitter element and positive potential is extended over conductor 94 to the emitter element of the unijunction transmitter 111, in the dwell timer circuit 110. However, during the period that the signals on the data path 6 exceed the predetermined limit, relaxation oscillator 71 operates to repeatedly provide negative going output signals over path 96 and capacitor 97 to the dwell clamping circuit 100, and as will be shown, the clamping circuit 100 inhibits operation of dwell timer 110 during such period.

When the amplitude of the data signal drops below the established value, the relaxation oscillator 71 is disabled and signals over conductor 96 to the dwell clamping circuit 100 are terminated. As a result, the clamp is removed and the dwell timer 110 initiates a preselected dwell timing period. As will be shown, the connection of different capacitors 106–109 result in adjustment of the dwell period to different values. At such time as the dwell timer 110 has measured the preselected time period, an output pulse is provided over conductor 119 to the bistable circuit 80 which resets to, in turn, turn off switching transistor 133 and thereby terminate the attenuation of the signals in data path 6.

The manner of operation of the dwell timer 110 in measuring the time period and controlling the bistable circuit 80 is now set forth. With reference to FIGURE 3, the dwell timer 110 basically comprises a unijunction transistor 111 which may be of the type commercially available at a 2N1671B and includes a first base element connected over resistor 112 to common conductor 79, and a second base circuit connected over resistor 116 to positive 15 volt potential, and also over path 119, capacitor 117 and resistor 118 to the base of the first transistor 81 in the bistable circuit 80, and an emitter element connected over adjustable resistors 114, 115 and resistor 113 and conductor 94' to the collector of the first transistor 81 in the bistable circuit 80.

The emitter element of transistor 111 in the dwell timer 110 is also connected over capacitor 106 (or 107, 108, 109) to conductor 79. With transistor 81 turned off (bistable circuit 80 set by reason of the detection of data signals having a level in excess of the preestablished value) a charging circuit is prepared for capacitor 106 which extends from positive 15 volt potential over resistors 83, 113, 114, 115, to capacitor 106 and conductor 79. However, as noted above, dwell clamping circuit 100 is operative during the period that the data signal is in excess of the preestablished value, and cyclically completes a shunt circuit over transistor 105 to prevent charging of capacitor 106.

More specifically, dwell clamping circuit 100 includes a first and a second transistor 101 and 105 respectfully which are connected over an input circuit and capacitor 97 and conductor 96 to the output of the relaxation oscillator 71. The first transistor 101 is a PNP transistor which may be of the type commercially available at a 2N1305 having an emitter element connected to ground, a base element connected over capacitor 97 and conductor 96 to the output of relaxation oscillator 71, and also over resistor 102 to ground, and over resistor 103 to positive 15 volt potential. The collector element of transistor 101 is connected to the base element of transistor 105, and also over resistor 104 to negative 15 volt potential. The emitter element of transistor 105 is connected to constant potential supply conducor 79, and the collector element of transistor 105 is connected over conductor 103 to the emitter of the unijunction transistor 111 in the dwell timer circuit 110.

During the period that the threshold setting is not exceeded by the data signal on data path 6, the relaxation oscillator 71 is turned off, and no output signal is provided over conductor 96 to the dwell clamping circuit 100. Transistor 101 is turned off and transistor 105 is turned off. As noted above, the negative voltage at the collector of transistor 81 biases the emitter element of transistor 111 negative which is therefore cut off.

As the data information on the data path 6 exceeds the threshold setting, the bistable circuit 80 is set (transistor 81 off, transistor 87 on) to establish a charging circuit which extends from positive 15 volt potential over resistors 83, 113, 114, 115 and capacitor 106 to conductor 79. However, with the relaxation oscillator 71 now turned on, the negative going signals cyclically turn on transistor 101 which turns on transistor 105 to complete a shunt circuit for capacitor 106 (which extends over transistor 105 and resistor 104 to negative 15 volt potential) to prevent capacitor 106 from building up a charge. As noted above, such condition exists as long as the data signal on data path 6 exceeds the threshold setting (i.e., relaxation oscillator 71 turned on). As a result, the dwell timer 110 will not begin its assigned measurement during the period that the attenuation switch transistor 133 is turned on by the bistable circuit 80 to introduce attenuation into the data path 6.

When the data signal on data path 6 falls below the threshold signal setting, relaxation oscillator 71 in trigger 70 is turned off, transistors 101 and 105 turn off, and the described charging circuit is completed for the connected one of the dwell range capacitors, such as 106. The charging of the capacitor in this manner initiates the timing period. At such time as the selected capacitor, such as 106, charges to a positive value sufficient to bias the unijunction transistor 111 to conduct, a time-out signal in the form of a negative pulse is transmitted over path 119, capacitor 117 and diode 95 to the base of transistor 81 in the bistable circuit 80 to turn on transistor 81 which turns off transistor 81 to reset the bistable circuit 80.

As the bistable circuit 80 resets, the resultant positive potential which appears at the collector of transistor 87 in the bistable circuit 80 is extended over conductor 131 and resistor 132 to turn off attenuation switch transistor 133, and thereby disconnect the attenuation from the data path. As a result, the data signals are now unattenuated as extended over the data path 6 to output circuit 165.

As the bistable circuit 80 resets and transistor 81 once more conducts, the negative signal on conductor 94' biases the emitter of unijunction transistor 111 negative to turn off the transistor 111. The charging circuit is ineffective at this time by reason of the negative potential on conductor 94'. Since transistors 101 and 105 were turned off as the relaxation oscillator was turned off, the circuits are now reset.

The time required to charge the selected capacitor 106 to the value necessary to bias transistor 111 to conduct is referred to as the dwell time. Manifestly, adjusting the arm 115 to different values will vary the current flow to capacitor 106 and correspondingly vary the length of the measured period. In a similar manner connection of capacitors (106–109) of different values in the circuit will vary the range of the dwell time.

Should the amplitude of the data signal increase to exceed the trigger threshold while the dwell timer 110 is measured a dwell period, the relaxation oscillator 71 will provide a signal to turn on transistors 101 and 105, whereby the charging circuit for capacitor 106 is cyclically by-passed and capacitor 106 is prevented by transistor 105 from building up a charge. The dwell clamping circuit 100 holds the dwell timer circuit 110 in such condition until the data signal again drops below the trigger threshold value level and the relaxation oscillator 71 is once more turned off to switch off transistor 101, 105. At such time the measurement of a new dwell timing period is initiated.

In the described embodiment the trigger circuit switches a preset amount of attenuation into the circuit which is variable by ratio control means 135 from 6 to 20 db. The setting of the trigger level is variable by adjustable resistor 69 from .5 volts to 4 volts.

Attenuation remains in the circuit as long as the data signal exceeds the attenuated trigger level. When the data signal drops below the trigger level the attenuation remains in the circuit for a predetermined length of time (dwell) which is selectable in four steps from 100 microseconds to 40 seconds (capacitors 106–109) and is then removed An indicator light 116 may be included for the purpose of indicating when attenuation is occurring. As shown in FIGURE 3, such arrangement may comprise an input conductor 165 connected to output circuit 131 of the bistable circuit 80. The indicator light circuit 166 includes a PNP transistor 169 which is turned on responsive to a negative potential on conductor 131 (attenuation switched in the system). With transistor 169 turned on, an energizing circuit is completed from negative 15 volts over resistor 171, lamp 170, and transistor 169 to ground, to cause the indicator light 170 to be illuminated.

In a further modification a by-pass control (not shown) can be provided which permits the input data signal to be shunted about the attenuator network circuit 130 when desired. In yet another modification, a transient trigger protection arrangement can be provided to eliminate switching of the attenuator by high level, high frequency transients. In such event the values of capacitors 33, 51, and 36 are suitably adjusted to decrease the bandwidth of the system.

It is also possible to cascade a pair of automatic attenuator boards, and in such event a transient trigger is required to give the second board a slower turn-on time. In addition, the trigger level of the second board must be set at a slightly higher value. If transient trigger protection is used on the first board, capacitors 33, 36, 51 on the second board must be of higher value than those of the first board, so that the turn-on time will be less.

In yet another option, an idefinite dwell time can be provided by disabling the dwell timer 110 by interrupting circuit path 94' by means not shown. In such event once the signal has reached a level high enough to trigger the trigger circuit, the attenuation network is switched in, and a manual reset button, such as 120, must be operated.

*Exemplary use of attenuator unit*

It will be apparent from the foregoing description that the automatic attenuator includes four basic operating controls including (a) an adjustable resistor 12 connected in the input circuit 10 to permit adjustment of the amplitude of the input signals coupled to the attenuator device 4; (b) a ratio control 135 (FIGURE 2) which is adjustable to different positions to vary the attenuation provided in the system; (c) a dwell control 115 (113) which is adjustable to different positions to vary the length of dwell within the range selected (i.e., the particular one of the dwell range capacitors connected in the circuit); (d) threshold setting device 67 (FIGURE 3) for varying the level at which attenuation is provided.

A manual reset 120 (FIGURE 3) may be provided which includes a reset button 123 for the purpose of connecting positive 15 volt potential over resistor 124 and conductor 125 to the emitter of the unijunction 111 to turn on transistor 111 and thereby reset the bistable circuit 80 to remove the attenuation from the data path 6. The dwell clamping circuit 100 is not used if a manual reset 120 is provided and infinite dwell time will result.

There is now set forth a typical application of the attenuation unit 6 and the manner in which the various controls are adjusted for such manner of use.

By way of example, it will be assumed that a strain gauge transducer is driving a direct current instrumentation amplifier with a 60 db dynamic range available at the amplifier output. Maximum output of the direct current amplifier is asumed ±10 volt D.C. from a 1 ohm source impedance. It is further assumed that it is desired to tape record the resulting signal at a tape speed of 1⅞ i.p.s. using FM recording techniques. The FM tape system has a 20,000 ohm input impedance and requires ±0.5 volt D.C. for full scale recording and has a dynamic range of 40 db. The automatic attenuator is to be connected between the D.C. amplifier and the tape recorder FM oscillator in such manner as to provide the equivalent of a 60 db dynamic range capability of the tape recorder system.

Since the source impedances of the D.C. amplifier and the attenuator device 4 are quite low with respect to the respective loads (20,000 ohms each) loading problems can be disregarded.

The well control 115 (FIGURE 3) is set to 100 microseconds (for convenience in detecting switching points), and the D.C. amplifier is driven to provide a full scale output of ±10 volt D.C. with a convenient signal, such as 1 kc. sine wave.

The input gain control 9 is then adjusted until the output test jack connected to output circuit 165 reveals that the automatic switching is being provided by the attenuator 4 as viewed on an oscilloscope.

The internal trigger level adjustment control 67 is now adjusted for a trigger threshold of ±0.5 volt D.C., whereby the trigger threshold is matched to the ±0.5 volt input sensitivity of the FM recording oscillator.

The direct current amplifier signal level is next reduced 20 db from ±10 volt D.C. to ±1 volt D.C. by reducing the signal level input to the input circuit 10. The input gain control 9 is then adjusted until the signal on output conductor 165 is just adequate to cause triggering on its peaks. This adjustment normalizes the direct current amplifier voltage range to the range of the attenuator unit 4.

The direct current amplifier signal is now returned to full scale ±10 volts D.C. and the attenuator ratio control 134 (FIGURE 2) on the attenuator unit 4 is adjusted until attenuated output is seen on the oscilloscope to equal ±0.5 volt D.C. Such adjustment effectively yields a 20 db attenuation value when switched.

The dwell control 115 (FIGURE 3) is then set for a time which corresponds to the expected duration of the overmodulation. The main purpose of the dwell control 115 is to permit a twofold choice of either fast recovery, or the prevention of rapid transfer back and forth from the switched to the unswitched state. The unit is now ready for use.

A typical set of signals which were obtained in a test setup for a 50 kc. carrier with 400 cycle modulation attenuated by the attenuation circuit with the unit set to trigger at 1 volt peak is shown in FIGURES 4–7. With reference to FIGURE 4, the signals there shown comprise a 50 kc. carrier with 400 cycle modulation that is unattenuated. The attenuator unit 4 in such instance has determined that the threshold value set in the attenuation device has not been exceeded, and no attenuation takes place. When the data signal exceeds the preset voltage level, plus or minus, the trigger circuit operates the switch 133 and the preset amount of attenuation is inserted. As shown in FIGURE 5, the trigger level has just been reached and the peak attenuated. The further showing in FIGURE 6 results as the amplitude of the signal continues to increase to the maximum output level, and the showing of FIGURE 7 results when the attenuated level has reached the trigger level.

CONCLUSION

The novel automatic attenuator unit is especially adapted for use in A.C. or D.C. instrumentation applications involving broad, unpredictable parameter variations in which improper calibration results in over or under modulation of the instrumentation link, and poor data fidelity. With the use of the novel attenuator unit, the possibility of over modulating the following stages in the instrumentation link is substantially eliminated. Furthermore, with the threat of over modulation completely removed, the channel sensitivity may be set precisely to the anticipated parameter value, thereby preventing undermodulation when the parameter variation does not meet expectations. Thus, the attenuator unit provides the equivalent of separate high and low sensitivity channels on a single instrumentation channel.

The attenuator unit need not be limited to unpredictable parameter variation applications. A broadly ranging parameter, such as altitude, might require mid-value accuracies approaching the full scale accuracy of the instrumentation link. Properly adjusted, the attenuator unit may be used as a range expander to provide full scale system accuracy at two selectable points on the altitude scale. Other possible applications of the attenuator unit include function generation, simulation, cascade switching and the like.

While what is described is regarded to be preferred embodiment of the invention, it is apparent that modifications and alterations may be made which include basic concepts of the invention, and it is intended in the appended claims to cover all such modifications and alterations as may fall within the true spirit and scope of the invention.

What is claimed is:

1. An attenutation device for extending the dynamic range of a recording system comprising a data path, an input circuit for at times supplying direct current signal data to said data path and at other times alternating current signals, an output circuit for connecting said data path to the recording system, an attenuation network, attenuation switch means for selectively inserting said attenuator network in said data path between said input and output circuit, sensing means for sensing the voltage level of the alternating current signal and direct current signal data input to said data path comprising trigger means including a trigger amplifier circuit having a differential amplifier connected to said input circuit, and a trigger circuit coupled to said trigger amplifier circuit including a bistable means operative from a first state to a second state responsive to an input signal from said differential amplifier indicating a predetermined voltage level has been exceeded, and output means from said bistable means for controlling said attenuator switch means to insert said attenuator network in said data path responsive to operation of the bistable means to said second state.

2. A system as set forth in claim 1 in which said bistable means comprises a bistable multivibrator circuit and said attenuator switch means comprises a semiconductor switch which is operative to a conductive state responsive to said signal from said bistable multivibrator to connect said attenuator network to said data path.

3. An attenuation device for extending the dynamic range of a recording system comprising a data path, an input circuit for supplying signal data to said data path, an output circuit for connecting said data path to the recording system, an attenuation network, attenuation switch means for selectively inserting said attenuator network in said data path between said input and output circuit, sensing means for sensing the voltage level of the data input to said data path comprising trigger means including a trigger amplifier circuit having bipolar sensing means connected to said input circuit, and a trigger circuit coupled to said bipolar sensing means including bistable means operative from a first state to a second state responsive to an input signal from said bipolar sensing means indicating a predetermined voltage level has been exceeded, and output means from said bistable means for controlling said attenuator switch means to insert said attenuator network in said data path responsive to operation of the bistable multivibrator to said second state.

4. An attenutation device for extending the dynamic range of a recording system comprising a data path, an input circuit for supplying signal data to said path, an output circuit for connecting said data path to the recording system, an attenuator network, attenuation switch means for selectively connecting said attenuation network in said data path between said input and output circuit, sensing means for providing signals indicating the voltage level of the data input to said data path, signal trigger means for providing a first control signal responsive to a signal from said sensing means indicating the data level is in excess of a preestablished value, and a second control signal responsive to a signal indicating a drop of the data level below said predetermined value, control means for selectively energizing said attenuation switch means to connect said attenuating network in said data path responsive to said first control signal, a dwell timer circuit for providing a time-out signal a predetermined period after said second control signal, said control means being operative to terminate energization of said attenuator switch means responsive to said time-out signal.

5. An arrangement as set forth in claim 4 in which said dwell timer circuit includes timing means for initiating measurement of said predetermined period responsive to said second control signal, and means responsive to reset said timing means responsive to a first control signal during the period of measurement by said timing means.

6. An attenuation device for extending the dynamic range of a recording system comprising a data path, an input circuit for supplying signal data to said data path, an output circuit for connecting said data path to the recording system, an attenuation network, attenuation switch means for selectively inserting said attenuator network in said data path between said input and output circuit, sensing means for providing a signal indicating the voltage level of the data input to said data path, trigger means for providing a first control signal responsive to a signal from said sensing means indicating the data level is in excess of a predetermined value, and a second control signal responsive to a signal indicating the data level dropped below said predetermined value, a bistable multivibrator circuit operable from a first position to a second position responsive to said first control signal, means for providing a potential to operate said attenuator switch means responsive to operation of said bistable circuit to said first position, a dwell timer circuit for providing a time-out signal a predetermined period after said second control signal, and means in said bistable circuit for operating said bistable circuit to said first position responsive to said time-out signal.

References Cited

UNITED STATES PATENTS

| 2,842,625 | 7/1958 | Holmes | 323—66 X |
| 2,888,636 | 5/1959 | McMenis | 323—66 X |
| 3,177,377 | 4/1965 | Brown | 328—165 X |
| 3,322,968 | 5/1967 | Dennis | 328—165 X |

FOREIGN PATENTS 382,658  10/1932  Great Britain.

JOHN F. COUCH, *Primary Examiner.*

A. D. PELLINEN, *Assistant Examiner.*